May 8, 1928.
J. K. BAYLES
1,669,225
AUTOMATIC RELEASE CLUTCH
Filed June 28, 1926    2 Sheets-Sheet 1
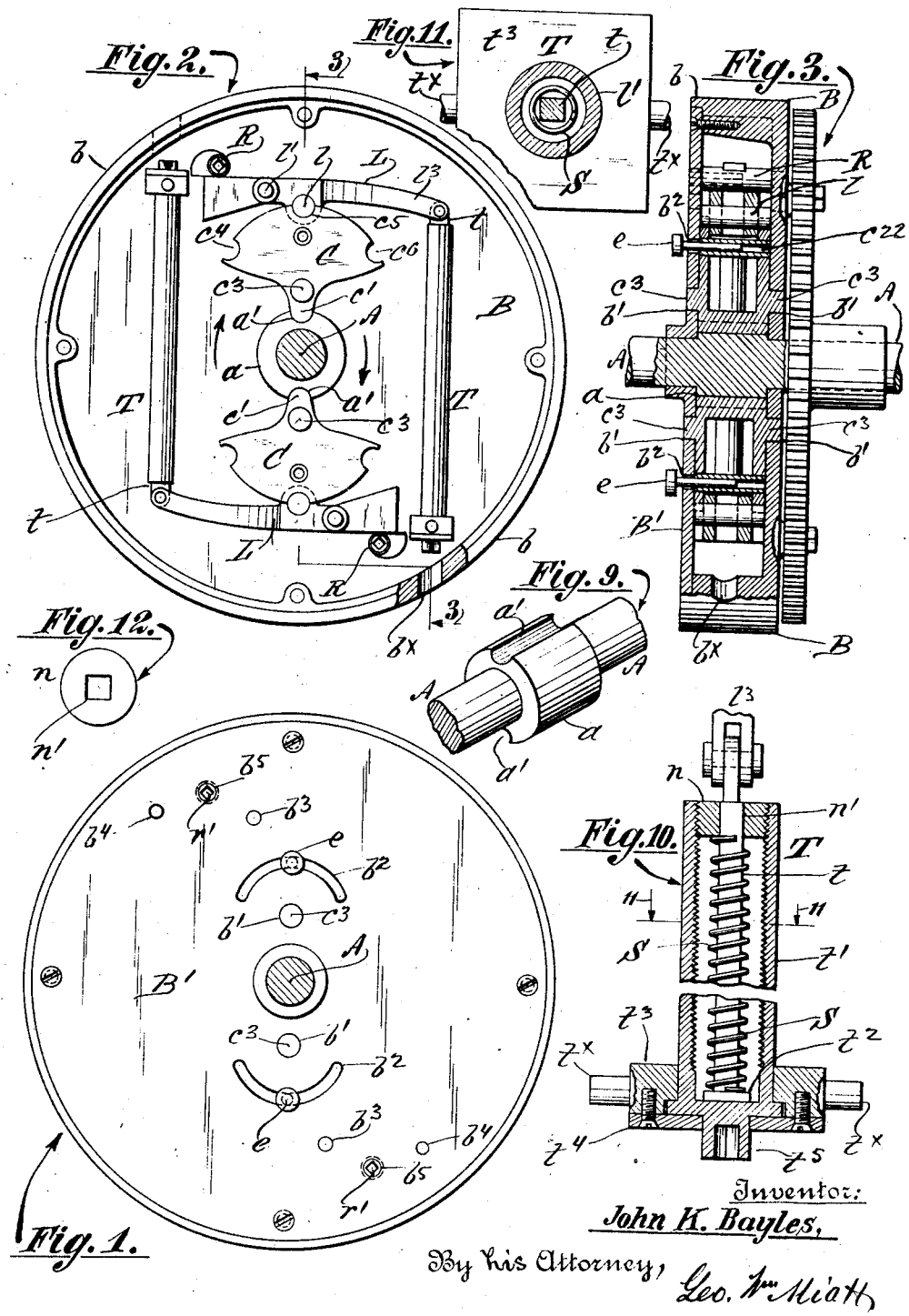
Inventor:
John K. Bayles,
By his Attorney, Geo. W. Miatt

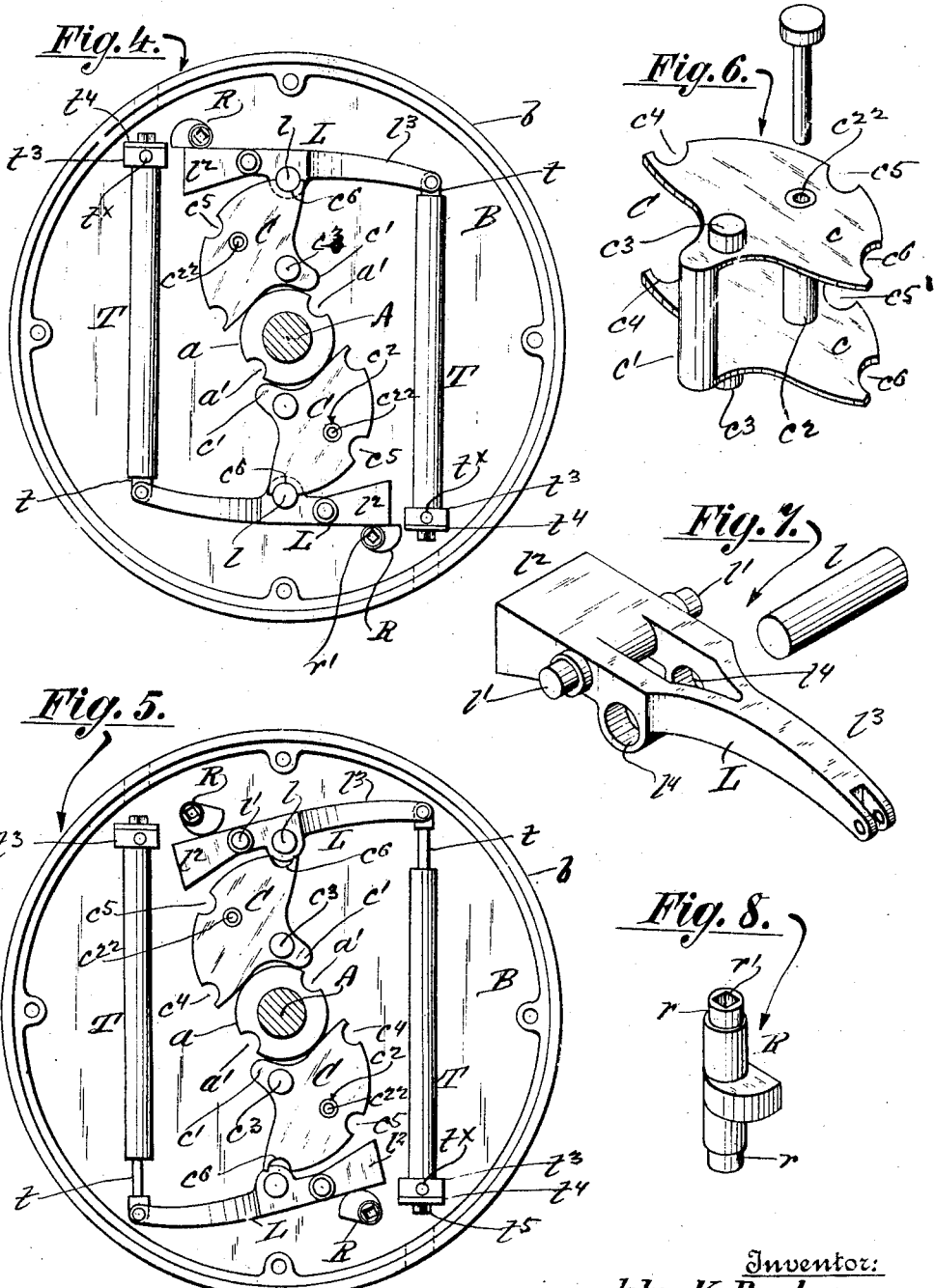

Patented May 8, 1928.

1,669,225

UNITED STATES PATENT OFFICE.

JOHN K. BAYLES, OF BUTLER, NEW JERSEY.

AUTOMATIC RELEASE CLUTCH.

Application filed June 28, 1926. Serial No. 118,935.

The object of my invention is to afford a simple, compact but effective automatic release clutch adapted to the various and varying requirements of power transmission,— a device that may be interposed advantageously between the driving and driven elements of machinery generally irrespective of the direction of rotation, and which is essentially positive in character within prescribable limits while insuring safety and integrity of parts and apparatus in the event of subjection to undue resistance or strain, all as hereinafter fully set forth; and to this end the invention consists in the specific combination and arrangement of the component parts of clutch mechanism described and claimed, whereby the above named and other superior results are attained as compared with the prior state of the art.

In the accompanying drawings I illustrate a practical embodiment of the essential features of my invention in an automatic release clutch of the character designated, although I do not limit myself to the identical construction of parts shown herein by way of exemplification, since changes may be made in minor details, and equivalent mechanical expedients resorted to, with like results, and without departing from the spirit and intent of my invention in this respect.

With this understanding:—

Fig. 1, is an elevation of what may be called for convenience of description the front side of my automatic release clutch;

Fig. 2, is an elevation taken upon the same side of the device, but with the front or cover plate removed, and showing the operative parts in locked relationship;

Fig. 3, is a sectional elevation taken upon the plane of line 3—3, Fig. 2;

Fig. 4, is a view similar to Fig. 2, showing the relative positions of the operative parts of the clutch after automatic release;

Fig. 5, is a view similar to Figs. 2 and 4, illustrating the method of re-setting the operative parts;

Fig. 6, is a perspective view upon a larger scale of one of the segmental latch cams, and one of the re-setting pins;

Fig. 7, is a perspective view upon the same scale as Fig. 6, of one of the lock levers and its lock roller;

Fig. 8, is a perspective view of one of the re-setting cams;

Fig. 9, is a perspective view of the shaft mortise collar flange and adjacent parts of the shaft;

Fig. 10, is a central longitudinal sectional elevation upon an enlarged scale, of one of the adjustable tension devices;

Fig. 11, is a transverse section thereof taken upon the plane of line 11—11, Fig. 10;

Fig. 12, is an end view of one of the travelling tension nuts.

The shaft A, is formed with an integral collar flange $a$, having approximately semicircular peripheral mortise grooves $a'$, $a'$, parallel with the longitudinal axis of the shaft as will be seen by reference more particularly to Fig. 9, of the drawings, in which latter I have shown a duplication of clutch mechanism arranged on opposite sides of the shaft A, but mounted independently thereof on supporting means rotatable on said shaft A, and consisting in the present case of a basic disc B, formed with a peripheral flange $b$, and of a front or cover plate B′, fitting in and detachably secured to said flange $b$, as shown more particularly in Figs. 1 and 3, of the drawings.

Pivotally mounted upon and between the base plate or disc B, and the cover plate B′, are the twin segmental latch cams C, C, the twin lock levers L, L, the twin re-set cams R, R, and the twin spring tension devices T, T.

This duplication of clutch mechanism on opposite sides of the shaft A, is obviously desirable in that it affords an equably balanced and substantial construction and operation of component parts, although as a matter of fact this provision of twin clutch means is not absolutely essential, since under certain conditions of use where "load" or strain would be comparatively slight, a single latch cam C, lock lever L, re-set cam R, and spring tension device T, may be provided with substantially like results in so far as automatic clutch release is concerned.

In order to attain lightness of structure, I prefer to make each latch cam member C, of two coincident parallel segmental plates $c$, $c$, united integrally by the bolt tongue $c'$, and by a tubular brace $c^2$, as shown in Fig.

6, of the drawings, although this is not an indispensable feature because a latch cam member of this character may be of solid one piece structure if preferred, as where a maximum degree of strength is desirable. In either case each latch cam C, is formed with side trunnions $c^3$, $c^3$, adjacent to the bolt tongue $c'$, said trunnions being seated in bearings $b'$, $b'$, formed for this purpose in both the basic plate or disc B, and the cover plate B', as will be seen by reference more particularly to Fig. 3, of the drawings. In either case, also, each latch cam C, is formed with a pin socket $c^{22}$, for the reception of a re-setting pin $e$,—the cover plate B', being formed with slots $b^2$, $b^2$, concentric with the trunnion bearing $b'$, $b'$, for the accommodation of these re-setting pins $e$, $e$, as shown clearly in said Fig. 3, of the drawings.

The peripheral surfaces of the latch cams C, which are concentric as related to the trunnions $c^3$, $c^3$, are formed with equi-distant semi-circular sockets $c^4$, $c^5$, $c^6$, for the reception upon occasion of the lock rollers $l$, $l$, of the lock levers L, L, as illustrated in Figs. 2 and 4, of the drawings.

The lock levers L, L, are formed with trunnions $l'$, $l'$, which are seated in bearings $b^3$, provided for the purpose in both the basic disc B, and the cover plate B'; and the rear extensions $l^2$, $l^2$, of said lock levers L, L, are of full width and solid structure to act as counterweights to the relatively narrow forward extensions $l^3$, $l^3$, of the levers L, L, to which the outer ends of the tension rods $t$, $t$, are pivotally connected, thus counterbalancing the tension means.

The ends of the lock rollers $l$, are rotatively mounted in bearings $l^4$, $l^4$, formed for the purpose in the side members of the levers L, adjacent to the trunnions $l'$, $l'$, as will be understood by reference more particularly to Fig. 7, of the drawings. Obviously non-rotatable lock pins might be substituted in lieu of the rollers $l$, for engagement with the cam sockets $c^4$, $c^5$, $c^6$, with substantially like results, but rollers are preferable in that they reduce wear and frictional resistance when the latch cams C, are shifted in position.

As before intimated each tension rod $t$, is pivotally connected with a lock lever L, from which it projects through a peripherally screw threaded travelling nut $n$, which engages with the internal screw thread of a tubular casing $t'$, in which a coiled compression spring S, is housed,—said tension rod $t$, extending to and resting against the closed inner end of the tubular casing $t'$, as shown in Fig. 10, of the drawings, by reference to which it will also be seen that the inner end of the tension rod $t$, is flanged to form a shoulder $t^2$, against which the inner extremity of the aforesaid compression spring S, rests, the other extremity of said compression spring S, bearing against the inner side of the travelling nut $n$, so that the position of the latter within the tubular casing $t'$, prescribes the extent of compression of the spring S, and hence the degree of elastic resilience exerted by it on the lock lever L, through the medium of said tension rod $t$. For this reason the tension rod $t$, is angular in cross section, preferably square, and extends through a correspondingly shaped channel $n'$, in the travelling nut $n$. Hence when the tubular casing is rotated the nut $n$, will be advanced or retracted according to the direction of such rotation, and the tension spring S, will be compressed more or less, as the case may be.

The tubular casing $t'$, is rotatably mounted upon and supported by means of a bearing block $t^3$, and cap plate $t^4$, which engage the externally flanged inner end of said tube $t'$, which is also formed with an axial extension $t^5$, protuberant through an aperture formed for the purpose in said cap plate $t^4$,—said axial extension $t^5$, being formed for engagement with a manipulative key or wrench which may be inserted upon occasion through a coincident opening (as $b^x$, Fig. 2) formed for the purpose in the peripheral flange $b$, of the basic disc B, and said bearing block $t^3$, being provided with trunnions $t^x$, $t^x$, fitting in bearings (as $b^4$, Fig. 1) formed for the purpose in both the basic disc B, and the cover plate B', by which means the bearing block $t^3$, tubular casing $t'$, etc., are thus supported, the trunnions $t^x$, $t^x$, allowing the tension device T, as a unit to adapt itself to the movements of the lock lever L.

Each re-set cam R, one of which is shown in detail in Fig. 8, of the drawings, is formed with trunnions $r$, $r$, by means of which it is pivotally supported in suitable bearings (as $b^5$, Fig. 1) formed for the purpose in both the basic disc B, and the cover plate B', said trunnioned ends $r$, $r$, being angularly recessed, as at $r'$, for the reception of a key pin (not shown) by means of which the re-set cam may be turned axially to rock the lock lever L, on its trunnion supports, as indicated, for instance, in Fig. 5, of the drawings. In its normal position however, as shown in Figs. 2 and 4, the re-set cam R, functions as a stop rest for the counterweight end $l^2$, of the lock lever L.

In Fig. 2, my interlocking clutch mechanism is shown as set to rotate the shaft A, and the disc B, in unison in either direction, it being understood that the shaft A, may be the rotative driving element and the disc B, the driven element, or that, conversely, the disc B, may be made to function as the driving element and the shaft A, as the driven element.

In either case any excess of torsional stress to which the driving element and the driven element may be subjected beyond that prescribed by the adjustable spring tension means for the purpose provided will result in the uncoupling of the latch cams C, C, from the shaft A. Thus, by way of illustration, the operative parts being in normal interlocked relationship as shown in Fig. 2, and presuming the shaft A, to be the driving element and the basic disc B, the driven element, both rotating in unison in the direction indicated by the arrows in said view, any excessive strain or resistance to which the driven element B, may be subjected will result in the release of the latch cam bolt tongues $c'$, $c'$, from the mortise grooves $a'$, $a'$, of the shaft A, and the release of the lock lever pins or rollers $l$, $l$, from the medial cam sockets $c^5$, $c^5$, of the latch cams C, C, the parts then assuming the relative positions shown in Fig. 4, with the shaft A, free to rotate independently. In other words, under the conditions just named, excess of resistance to the rotation of the driven element B, will cause the sides of the mortise grooves $a'$, $a'$, of the shaft A, acting on the cam bolt tongues $c'$, $c'$, to rock the latch cams C, C, on their trunnions $c^3$, $c^3$, and force the lock lever pins or rollers $l$, from said peripheral sockets $c^5$, $c^5$, of the latch cams C, C, the springs S, S, of the tension elements T, T, allowing the lock levers L, L, to yield to that extent and then causing said lock levers L, L, by the engagement of their pins or rollers with the cam sockets $c^6$ $c^6$, to hold one side of each of the latch cams C, C, in contact with the peripheral surface of the shaft collar flange $a$, as shown in said Fig. 4, of the drawings, from which position the latch cams can only be shifted manually by means of the re-set pins $e$, $e$, after the lock levers L, L, have been rocked on their fulcrums $l'$, $l'$, by means of the reset cams R, R, as indicated in Fig. 5, of the drawings.

It will thus be understood that upon occasion the re-setting of the clutch mechanism with the bolt tongues $c'$, $c'$, of the latch cams C, C, again in contactual engagement with the mortise grooves $a'$, $a'$, of the shaft A, may be effected extraneously by means of the re-set cams R, R, and the pins $e$; and that a change and adjustment of spring tension may also be effected by extraneous means, as by a suitable implement inserted through the holes $b^x$, formed for the purpose in the flange $b$, of the disc B, and engaging with the axial extensions $t^5$, of the tubular casings T, by the turning of either of which latter on its longitudinal axis the adjustment of its travelling nut $n$, may be accomplished, to afford the requisite degree of elastic resilient tension exerted by the springs S, S, upon the tension rods $t$, lock levers L, and latch cams C.

My automatic clutch and release mechanism is simple and compact in construction and arrangement of parts, and hence comparatively inexpensive to manufacture; can be adjusted to release at any desired degree of resistance or overload; may be driven in either direction of rotation with the basic disc B, as the driven element and the shaft A, as the driving element, or vice versa; is rigid and positive in action within the prescribed tension limit; can be duplicated in sizes adapted to the varying requirements of use, as for delicate machinery or that of the heavier duty type; frictional resistance and contact between the operative parts is reduced to a minimum degree; when released automatically it also automatically prevents re-engagement between driving and driven elements until the parts are re-set manually, thus obviating all danger of jar or injury to parts and apparatus involved; is instantaneous in release, upon which the driving element can continue to rotate indefinitely without danger to the installation; the clutch as a unit is well balanced and can be rotated at any practicable speed without vibration; and the adjustable spring tension devices remain essentially the same in length and position irrespective of the prescribed degree of tension attained thereby.

What I claim as my invention and desire to secure by Letters Patent, is:—

1. In an automatic release clutch of the character designated, the combination of a rotatable shaft formed with a peripheral mortise groove, a lock lever, and clutch mechanism mounted upon independent supporting means rotatable on said shaft, and consisting of a latch cam formed with a bolt tongue for engagement with said shaft mortise groove, and also formed with peripheral sockets for engagement with said lock lever, spring tension means connected with said lock lever, and means to rock the lock lever against the tension of the spring, tension means, substantially in the manner and for the purpose set forth.

2. In an automatic release clutch of the character designated, the combination of a rotatable shaft formed with a peripheral mortise groove, a lock lever, and clutch mechanism mounted upon independent supporting means rotatable on said shaft and consisting of a latch cam formed with a bolt tongue for engagement with said shaft mortise groove, and also formed with peripheral sockets for engagement with said lock lever, and spring tension means connected with said lock lever, together with a re-set cam adapted to rock said lock lever against the resistance of said spring tension means, substantially in the manner and for the purpose set forth.

3. In an automatic release clutch of the character designated, the combination of a rotatable shaft formed with a peripheral mortise groove, a lock lever, and clutch mechanism mounted upon independent supporting means rotatable on said shaft and consisting of a latch cam formed with a bolt tongue for engagement with said shaft mortise groove, and also formed with peripheral sockets for engagement with said lock lever, said lock lever having a counterweight at one end and adjustable spring tension means connected with said lock lever, substantially in the manner and for the purpose set forth.

4. In an automatic release clutch of the character designated, the combination of a rotatable shaft formed with a peripheral mortise groove, a lock lever, and clutch mechanism mounted upon independent supporting means rotatable on said shaft and consisting of a latch cam formed with a bolt tongue for engagement with said shaft mortise groove, and also formed with peripheral sockets for engagement with a contact roller on said lock lever, said lock lever having a counterweight at one end, and spring tension means connected with said lock lever, substantially in the manner and for the purpose set forth.

5. In an automatic release clutch of the character designated, the combination of a rotatable shaft formed with a peripheral mortise groove, a lock lever, and clutch mechanism mounted upon independent supporting means rotatable on said shaft and consisting of a latch cam formed with a bolt tongue for engagement with said shaft mortise groove and with peripheral sockets for engagement with a contact roller on said lock lever, adjustable spring tension means connected with said lock lever, and a re-set cam adapted to rock said lock lever against the resistance of said spring tension means, substantially in the manner and for the purpose set forth.

6. In an automatic release clutch of the character designated, the combination of a rotatable shaft formed with peripheral mortise grooves on opposite sides thereof, lock levers, and duplicate clutch mechanism mounted upon independent supporting means rotatable on said shaft, said duplicate clutch mechanism being arranged upon opposite sides of said shaft and each duplicate consisting of a latch cam formed with a bolt tongue for engagement with said shaft mortise grooves, and with peripheral sockets for engagement with one of said lock levers, spring tension means connected with said lock levers, said lock levers having each a counterweighted end, substantially in the manner and for the purpose set forth.

7. In an automatic release clutch of the character designated, the combination of a rotatable shaft formed with peripheral mortise grooves on opposite sides thereof, lock levers, and duplicate clutch mechanism mounted upon independent supporting means rotatable on said shaft, said duplicate clutch mechanism being arranged upon opposite sides of said shaft and each duplicate consisting of a latch cam formed with a bolt tongue for engagement with said shaft mortise grooves, and with peripheral sockets for engagement with one of said lock levers, and spring tension means connected with said lock levers, said lock levers each having a counterweighted end together with re-set cams adapted to rock said lock levers against the resistance of said spring tension means, substantially in the manner and for the purpose set forth.

8. In an automatic release clutch of the character designated, the combination of a rotatable shaft formed with peripheral mortise grooves on opposite sides thereof, lock levers, and duplicate clutch mechanism mounted upon independent supporting means rotatable on said shaft, said duplicate clutch mechanism being arranged upon opposite sides of said shaft and each duplicate consisting of a latch cam formed with a bolt tongue for engagement with said shaft mortise grooves, and with peripheral sockets for engagement with one of said lock levers, and adjustable spring tension means connected with said lock levers, substantially in the manner and for the purpose set forth.

9. In an automatic release clutch of the character designated, the combination of a rotatable shaft formed with peripheral mortise grooves on opposite sides thereof, lock levers, and duplicate clutch mechanism mounted upon independent supporting means rotatable on said shaft, said duplicate clutch mechanism being arranged upon opposite sides of said shaft and each duplicate consisting of a latch cam formed with a bolt tongue for engagement with said shaft mortise grooves, and with peripheral sockets for engagement with a contact roller on one of said lock levers, said lock levers each having a counterweighted end, and spring tension means connected with said lock levers, substantially in the manner and for the purpose set forth.

10. In an automatic release clutch of the character designated, the combination of a rotatable shaft formed with a peripheral mortise groove, a lock lever, and clutch mechanism mounted upon independent supporting means rotatable on said shaft and consisting of a latch cam formed with a bolt tongue for engagement with said shaft mortise groove and also formed with peripheral sockets for engagement with said lock lever, spring tension means and said lock lever formed with a counterweight at one extremity and connected with said spring tension means at its other extremity, substantially in the manner and for the purpose set forth, 11. In an automatic release clutch of the character designated, the combination of a rotatable shaft having a groove therein, a support rotatable on said shaft, a device pivoted on said support and having a projection to engage said groove and sockets arranged in an arc of a circle around the pivotal axis of the device, a lock lever pivoted on said support and having a projection to enter said sockets, and spring tension means for said lock lever including a compression spring and adjusting means for varying the compression of said spring.

JOHN K. BAYLES.